G. E. O'HEARN.
GO-CART.
APPLICATION FILED OCT. 27, 1914.
1,212,243.
Patented Jan. 16, 1917.
2 SHEETS—SHEET 1.
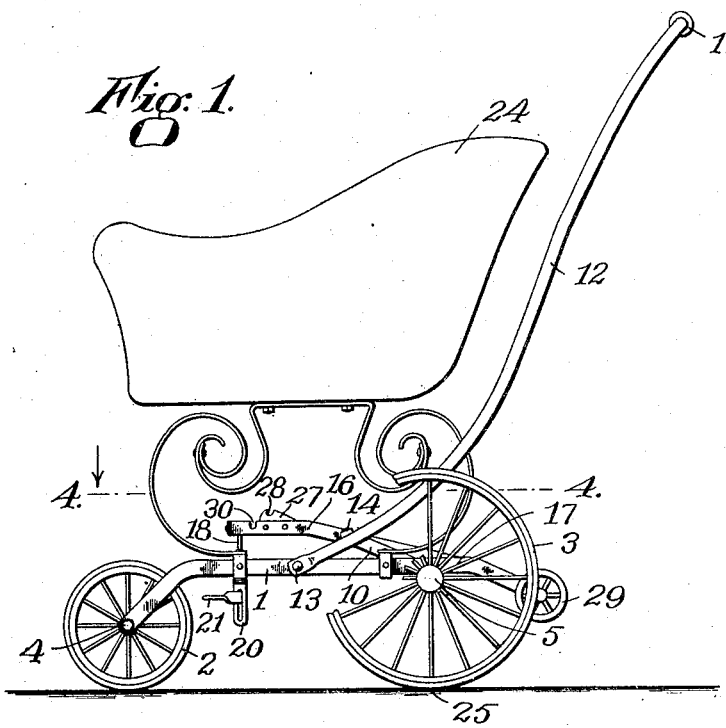
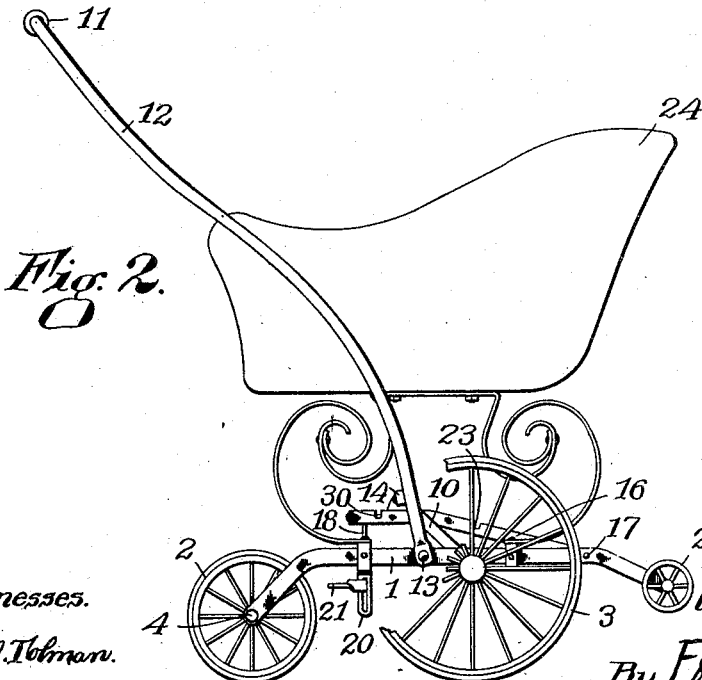

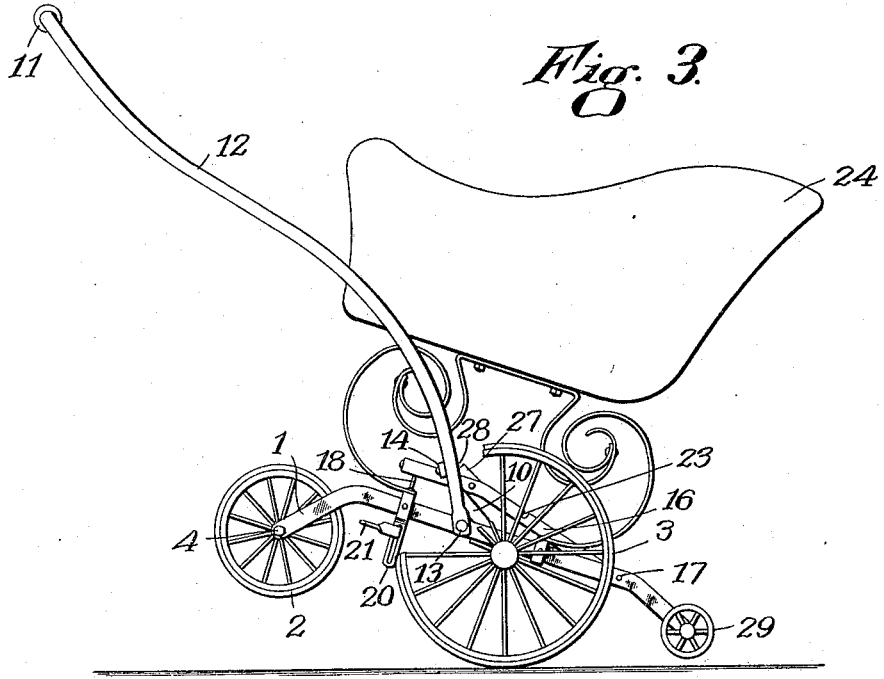
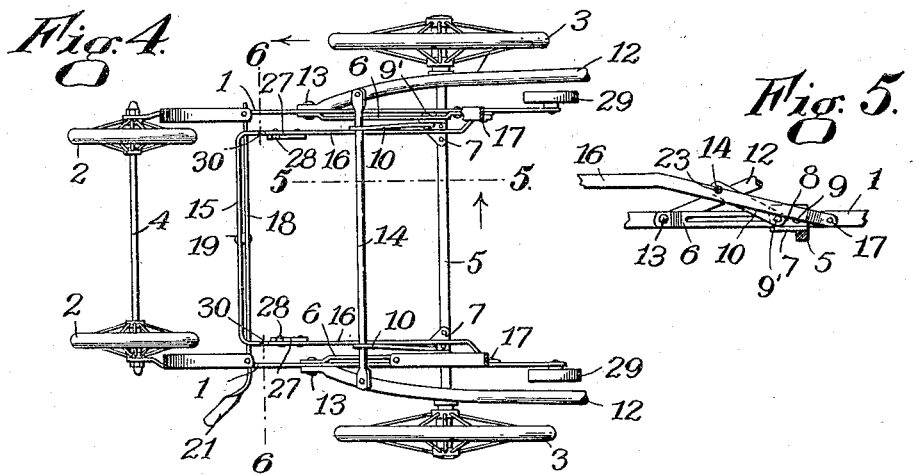
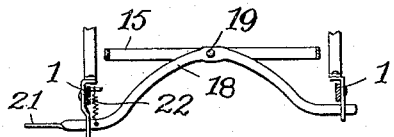

UNITED STATES PATENT OFFICE.

GEORGE E. O'HEARN, OF GARDNER, MASSACHUSETTS, ASSIGNOR TO HEYWOOD BROTHERS AND WAKEFIELD COMPANY, OF GARDNER, MASSACHUSETTS, A CORPORATION OF NEW JERSEY.

GO-CART.

1,212,243.   Specification of Letters Patent.   Patented Jan. 16, 1917.

Application filed October 27, 1914. Serial No. 868,839.

*To all whom it may concern:*

Be it known that I, GEORGE E. O'HEARN, a citizen of the United States, residing at Gardner, in the county of Worcester and Commonwealth of Massachusetts, have invented a new and useful Improvement in Go-Carts, of which the following, taken in connection with the accompanying drawings, is a specification.

The present invention relates to baby carriages of the type generally designated as go-carts. The invention has particular reference to the disposition and arrangement of the handle bar or tongue of a four-wheel vehicle of this class, by the movement of which into a predetermined position, the propulsion of the go-cart as a two-wheeled vehicle, or gig, is insured. The invention also contemplates other positions into which said handle bar may be moved, with attendant advantages to be derived therefrom under varying conditions of operation of the go-cart, all as particularly set forth in the following description, and illustrated in the accompanying drawings, in which—

Figure 1 is a side elevation of a go-cart embodying my invention. Fig. 2 is a view similar to Fig. 1, showing a different disposition of the handle bar or tongue. Fig. 3 is a similar view showing a still different disposition of the handle bar or tongue. Fig. 4 is a top plan view of the frame of the go-cart viewed from the plane of the line 4—4, Fig. 1. Fig. 5 is a fragmentary side elevation viewed from the plane of the line 5—5, Fig. 4, and Fig. 6 is a fragmentary end elevation viewed from the plane of line 6—6, Fig. 4.

Similar reference characters refer to similar parts in the different figures.

My improved go-cart embodies a frame comprising parallel longitudinal side members 1, 1, which lie horizontal for the major portion of their length, as shown in Fig. 1, being inclined downwardly at their forward ends to provide a "drop" frame construction accommodating itself to the use of small front wheels 2 and relatively large rear wheels 3 for supporting said frame in a substantially horizontal position, as shown in Fig. 1. The front wheels 2 are suitably journaled on a front axle 4, rigidly secured between the forward ends of said side members, while the rear wheels 3 are suitably journaled on the projecting ends of a transversely extending rear axle 5, which is disposed for limited movement longitudinally of the horizontal portions of said side members, in the manner about to be described.

The horizontal portion of each member 1 has secured to its inner face a slotted guideway 6, which is spaced inwardly therefrom for the major portion of its length, as clearly shown in Fig. 4. The rear axle 5 has secured thereto a pair of brackets 7, 7 having vertically disposed ears 8, 8, each of which carries a pair of outwardly projecting pins 9, 9' adapted to ride in the slots of the adjacent guideway 6. The forwardly disposed pins 9' of both pairs are preferably extended inwardly to serve as pivotal connections for links 10, hereinafter more specifically referred to.

The means for propelling the vehicle consists of a handle bar 11, supported between the ends of substantially parallel longitudinal tongue members 12, 12. The other ends of said tongue members 12, 12 converge slightly and are pivoted to the outside of their corresponding side members 1, 1 at the points 13, 13, preferably by means of the same rivets or bolts which are used in securing the forward ends of the guideways 6 to the inner faces of said side members. Said tongue members have secured thereto a short distance from their pivotal axis a cross bar 14 which passes loosely through apertures in the forward ends of links 10. It will be apparent that movement of the tongue about its pivotal axis is accompanied by a corresponding movement of the rear axle 5 with respect to the guideways 6, due to the connection effected by the links 10. This results in a shortening or lengthening of the effective wheel base of the vehicle, dependent upon the direction in which the handle bar is swung.

A member 15, having its central portion transverse to the frame of the go-cart, and having rearwardly extending side portions 16, is provided, to coöperate with the cross bar 14 in holding the handle bar or tongue in its various positions. To this end the rear end of each side portion 16 of said member 15 is pivoted to the inside of the adjacent side member 1, preferably by means of the same rivets or bolts 17 which serve to secure the rear ends of the guideways 6 to the inner faces of said side members. A curved or arched lever 18, extending transversely of the framework, has one end pivotally supported with respect to one of said side members 1, and is operatively connected at its highest point 19 to the central transverse portion of member 15, the free end of said lever passing through an elongated slot in a depending bracket 20 carried by the other side member, and being formed on its end with a pedal 21. A spring 22 yieldingly maintains the free end of the lever 19 at the upper end of the slot in said bracket, with the result that the member 15 is disposed in an inclined position with its side portions 16 pressing against the cross bar 14. The side portions 16 are formed near their rear ends with transversely alined notches 23, 23, adapted to receive the cross bar 14, when the tongue is swung into the position shown in Fig. 1, the upward tendency of the member 15 serving to lock the tongue in this position until such member is lowered by the compression of pedal 21.

In the position of the parts shown in Fig. 1, the disposition of the handle bar is such that the rear axle 5 has been moved to the limit of its distance from the front axle 4, providing a four-wheel vehicle which is adapted to be pushed in the same direction in which the occupant of the body 24 is facing, the handle bar 11 being at a convenient and proper distance above the ground for seizure by a person of average height.

The forward disposition of the small wheels 2 facilitates the passage of the vehicle over obstructions, such as curb-stones, by the exertion of a downward pressure on the handle bar sufficient to raise the forward end of the go-cart about the point 25 as a center.

The side portions 16 of the member 15 carry lugs 27 having transversely alined notches 28, adapted to receive the cross bar 14, and to lock the handle bar against further movement when the latter is swung into the position illustrated in Fig. 2. The propulsion of the go-cart, when the handle bar is so disposed, enables the operator to face the occupant of the go-cart, and furthermore, enables the facing position of the occupant, with respect to the sun, to be changed, as desired. Ordinarily, the propulsion of the vehicle with the large wheels forward would be attended with difficulties in surmounting obstructions, such as curbstones, but in the present instance the inward movement of the rear axle 5, consequent to the swinging of the handle bar into the position illustrated, renders available a pair of small rollers or wheels 29, 29 journaled on the extreme ends of the side members 1, 1. In the normal operation of the go-cart as a four-wheel vehicle, these wheels 29, 29 are spaced above the ground, but are always available for facilitating the passage of the vehicle over an obstruction, when the parts are in the positions shown in Fig. 2.

The side portions 16 of member 15 are formed with transversely alined notches 30, 30 on the other side of the notches 28 from the notches 23, and adapted to receive the cross bar 14 when the tongue is swung into the position shown in Fig. 3. The disposition of the tongue in this extreme position has the effect of bringing the handle bar 11 nearer the ground when the vehicle rests on its four wheels, than in the positions of the go-cart shown in Figs. 1 and 2. Thus when the handle bar is seized by a person of average height for the propulsion of the vehicle, the small wheels 2 are lifted clear of the ground, enabling the operation of the go-cart as a two-wheel vehicle, or gig, as shown in Fig. 3. Furthermore, this disposition of the handle bar renders possible the convenient propulsion of the go-cart as a four-wheel vehicle, by a person of less than average height, as, for instance, a small child, consequent to the lowering of the handle bar 11 when the wheels 2 in Fig. 3 are resting on the ground.

In the operation of the go-cart both as a four-wheeled vehicle, as shown in Fig. 2, and as a gig, as shown in Fig. 3, the disposition of the large wheels 3 in relatively close proximity to the wheels 2, renders the small auxiliary rollers or wheels 29 available for assisting the movement of the go-cart onto a higher lever, such as a curbstone, as previously described, and also for insuring the movement thereof onto a lower level without the jar which would otherwise occur. In the latter instance, as the large wheels 3 pass off the curb, with the body of the vehicle held substantially level, the auxiliary wheels 29 ride on the higher level simultaneously with the dropping of the large wheels to the lower level.

I claim,

1. A vehicle of the class described having two sets of ground wheels, a handle bar for the propulsion of said vehicle, means for retaining said handle bar in operative position, with respect to either end of the vehicle, for the propulsion thereof on both sets of ground wheels, and means for retaining said handle bar in a position beyond said other positions whereby the propulsion of said vehicle on a single set of ground wheels is effected when said bar is held at the normal height.

2. A vehicle of the class described having ground wheels and a set of auxiliary wheels, a handle bar for the propulsion of said vehicle, means for retaining said handle bar in operative position with respect to either end of the vehicle, and means, actuated by the movement of the handle bar into operative position with respect to one end of the vehicle, for disposing said auxiliary wheels in operative position when said bar is held at the normal height.

3. A vehicle of the class described having two sets of ground wheels and a single set of auxiliary wheels, a handle bar for the propulsion of said vehicle, means for supporting said handle bar in position for the propulsion of said vehicle on both sets of ground wheels, means for supporting said handle bar in position for the propulsion of said vehicle on a single set of ground wheels, and means, actuated by the movement of the handle bar from said first position to said second position, for disposing said auxiliary wheels in operative position.

4. A vehicle of the class described having two sets of ground wheels and a single set of auxiliary wheels, a handle bar for the propulsion of said vehicle, means for supporting said handle bar in operative position, with respect to either end of the vehicle, for the propulsion thereof on both sets of ground wheels, means for supporting said handle bar in operative position, with respect to one end of the vehicle, for the propulsion thereof on a single set of ground wheels, and means, actuated by the movement of the handle bar from one of said first mentioned positions to the other first mentioned position, or to the second mentioned position, for rendering said auxiliary wheels operative.

5. A vehicle of the class described, comprising a pair of longitudinally spaced axles on which are journaled ground wheels, a member through which the propelling force is applied to the vehicle, said member being movable into predetermined positions with respect to the frame of the vehicle, and means operatively connecting said member to one of said axles, whereby the movement of said member varies the longitudinal distance between said pair of axles.

6. A vehicle of the class described, comprising two sets of longitudinally spaced ground wheels, a tongue member pivotally supported with respect to the frame of the vehicle and movable into different operative positions with respect thereto, and an operative connection between said tongue and one of said sets of ground wheels, whereby movement of said tongue varies the distance between the axes of said sets of ground wheels.

7. A vehicle of the class described, comprising a stationary wheel supporting axle, and a second wheel supporting axle movable longitudinally of the frame of the vehicle, means through which a propelling force is applied to the vehicle, said means being movable into a plurality of different operative positions, and means operatively connecting said first mentioned means with said movable axle, whereby to vary the effective wheel-base of the vehicle.

Dated this seventeenth day of October, 1914.

GEORGE E. O'HEARN.

Witnesses:
 EDWARD G. WATKINS,
 THATCHER B. DUNN.

Copies of this patent may be obtained for five cents each, by addressing the "Commissioner of Patents, Washington, D C."